US009894492B1

(12) United States Patent
Elangovan et al.

(10) Patent No.: US 9,894,492 B1
(45) Date of Patent: Feb. 13, 2018

(54) SYSTEM AND METHOD FOR DETERMINING MOBILE DEVICE LOCATION RELATIVE TO VEHICLE CABIN

(71) Applicant: Ford Global Technologies, LLC, Dearborn, MI (US)

(72) Inventors: Vivekanandh Elangovan, Dearborn, MI (US); John Robert Van Wiemeersch, Novi, MI (US); Daniel M King, Northville, MI (US); Kevin Thomas Hille, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/273,548

(22) Filed: Sep. 22, 2016

(51) Int. Cl.
| | |
|---|---|
| H04W 4/04 | (2009.01) |
| H04W 12/08 | (2009.01) |
| H04W 52/02 | (2009.01) |
| H04W 72/08 | (2009.01) |
| H01Q 1/32 | (2006.01) |

(52) U.S. Cl.
CPC .......... *H04W 4/046* (2013.01); *H01Q 1/3241* (2013.01); *H04W 12/08* (2013.01); *H04W 52/0245* (2013.01); *H04W 72/085* (2013.01)

(58) Field of Classification Search
CPC . H04W 4/046; H04W 12/08; H04W 52/0245; H04W 72/085
USPC ............. 455/410, 411, 26.1, 452.2, 509, 62; 380/247, 248, 249, 250, 255, 270, 271
See application file for complete search history.

(56) References Cited

U.S. PATENT DOCUMENTS

| | | | |
|---|---|---|---|
| 9,008,917 B2 | 4/2015 | Gautama et al. | |
| 9,358,940 B2 | 6/2016 | Cooper et al. | |
| 2005/0221868 A1* | 10/2005 | Childress | H03G 3/342 |
| | | | 455/569.2 |
| 2007/0052520 A1* | 3/2007 | Talty | B60C 23/0408 |
| | | | 340/10.1 |
| 2012/0244877 A1* | 9/2012 | Margalef | G01S 5/0252 |
| | | | 455/456.1 |
| 2014/0240091 A1 | 8/2014 | Talty et al. | |

(Continued)

FOREIGN PATENT DOCUMENTS

JP 2012117292 A 6/2012

*Primary Examiner* — Inder Mehra
(74) *Attorney, Agent, or Firm* — James P. Muraff; Neal, Gerber & Eisenberg LLP

(57) ABSTRACT

Embodiments include a vehicle comprising a plurality of antennas positioned at locations inside and outside a vehicle cabin, each antenna being in wireless communication with an external mobile device and being associated with signal strength information; and a central module in communication with the antennas and configured to identify the antennas with the two strongest signals, and determine a mobile device location relative to the vehicle cabin based on the locations of the identified antennas. Embodiments also include a method comprising receiving signal strength information associated with a plurality of antennas wirelessly communicating with a mobile device, the antennas positioned at locations inside and outside a vehicle cabin; identifying a first antenna having a first highest signal strength and a second antenna having a second highest signal strength; and determining a mobile device location relative to the vehicle cabin based on the locations of the first and second antennas.

19 Claims, 5 Drawing Sheets

(56) References Cited

U.S. PATENT DOCUMENTS

| | | | |
|---|---|---|---|
| 2015/0048927 A1 | 2/2015 | Simmons | |
| 2015/0149042 A1* | 5/2015 | Cooper | B60R 16/037 |
| | | | 701/48 |
| 2016/0063786 A1 | 3/2016 | Lewis et al. | |
| 2016/0197398 A1* | 7/2016 | Scheim | H01Q 1/3275 |
| | | | 343/713 |
| 2017/0120868 A1* | 5/2017 | Watanabe | B60R 25/245 |

\* cited by examiner

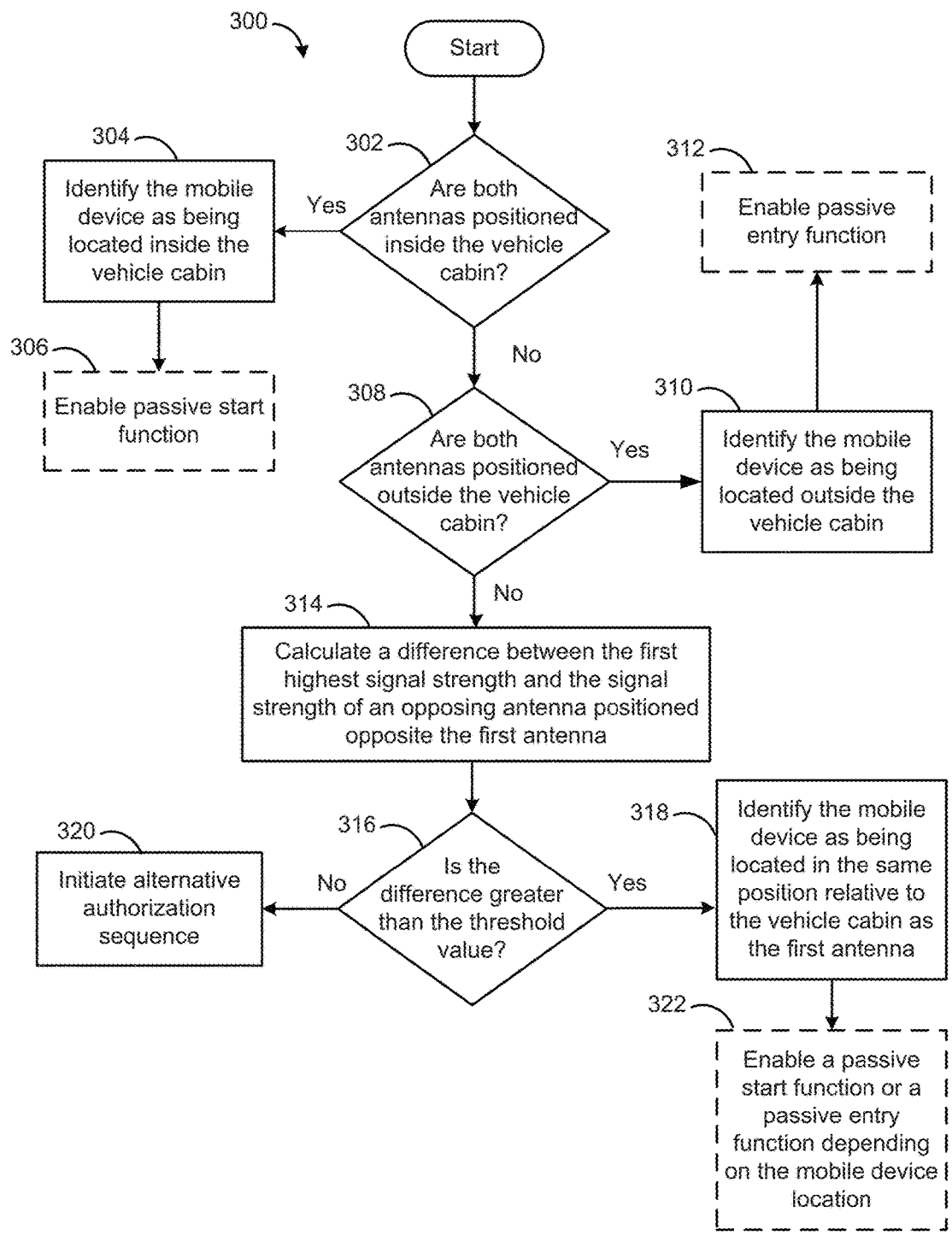

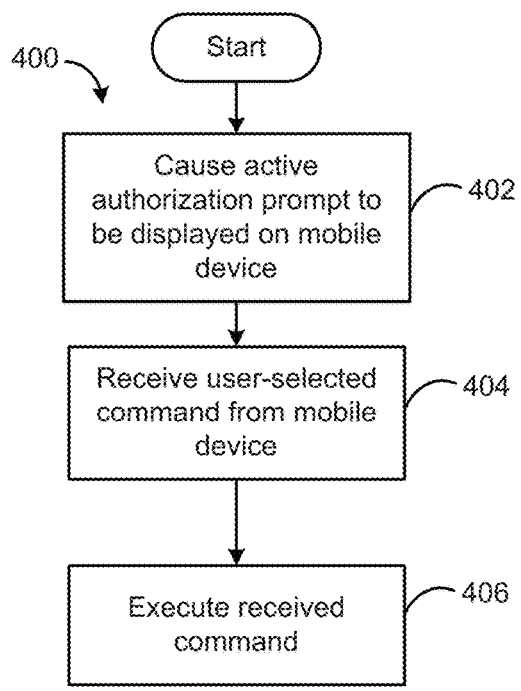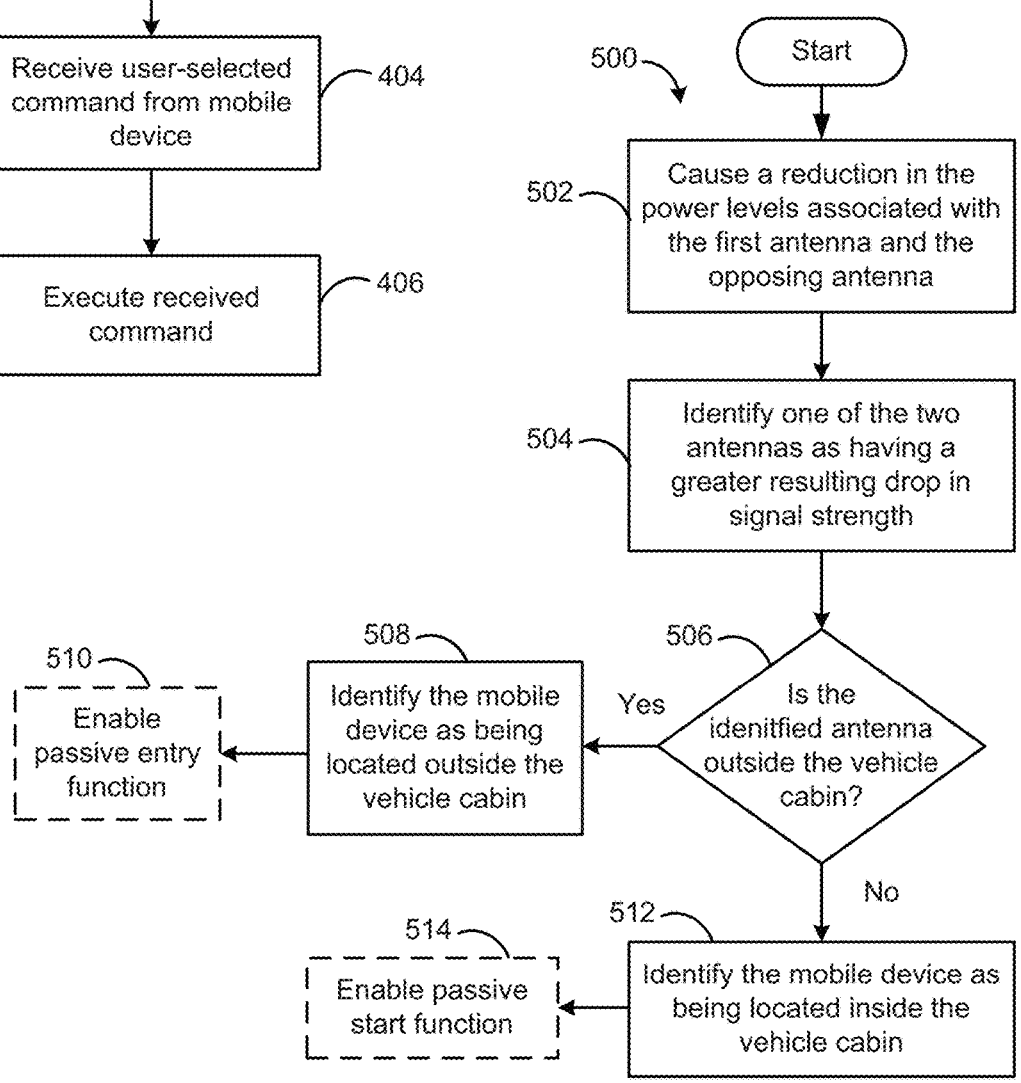

SYSTEM AND METHOD FOR DETERMINING MOBILE DEVICE LOCATION RELATIVE TO VEHICLE CABIN

TECHNICAL FIELD

This application generally relates to Passive Entry Passive Start (PEPS) systems and more specifically, to enabling a mobile device to operate as a PEPS key fob for controlling functions in the vehicle.

BACKGROUND

Many vehicles include a Passive Entry Passive Start (PEPS) system, also known as an Intelligent Access (IA) system, that enables vehicle entry and start capabilities without any physical handling of a traditional key or key fob by the driver or other vehicle user, as long as the user is carrying a valid key fob either on the user's person (e.g., in hand or in a pocket) or in a nearby belonging, such as a purse, jacket, or briefcase. The PEPS system typically includes a key fob with buttons or switches for enabling user-initiated control of various vehicle functions, including remote keyless entry (RKE) functions (e.g., locking and unlocking vehicle doors, opening and/or closing the trunk, tailgate, or sliding doors of the vehicle) and/or remote keyless ignition (RKI) functions (e.g., starting the vehicle engine in a non-motive mode that does not allow the vehicle to drive away). One or more of these key fob functions can be passively initiated by the PEPS system (i.e. without physical handling of the key fob) upon detecting certain conditions related to the key fob.

For example, existing PEPS system may perform key checks or other background tasks (i.e. without the user's knowledge) for detecting the presence of a key fob within a predetermined proximity of the vehicle, making sure a detected key fob is valid (e.g., linked to that vehicle), and/or determining the location of a valid key fob relative to the vehicle cabin (e.g., inside or outside the cabin). Based on the results of these key checks, the PEPS system may authorize a passive entry (e.g., unlocking the vehicle doors without requiring user-selection of an unlock button on the key fob), or a passive start (e.g., starting the vehicle engine in a motive mode that allows the vehicle to drive away in response to user-selection of an ignition button within the vehicle). The PEPS system may also perform background key checks in association with other vehicle functions that require the presence of the key fob for authorization purposes, such as "open sesame" or approach detection.

Given the ubiquitous nature of smartphones and other mobile devices in today's technology-driven world, some PEPS systems are further configured to include a Phone-as-a-Key (PaaK) feature, which enables the user's phone to function as the PEPS key fob and eliminates the need to carry a key fob for accessing and controlling the vehicle. For example, the PaaK feature allows the phone to be used for traditional key fob functions, such as unlock, lock, remote start, lift gate, and mobilization authorization, without the presence of a key fob.

While traditional PEPS key fobs use a Low Frequency (LF) receiver and an Ultra-High Frequency (UHF) transmitter to communicate with the vehicle, the PaaK feature is typically implemented using BLUETOOTH Low Energy (BLE) communications devices included in both the vehicle and the phone. However, BLE signals may be more prone to signal degradation due to reflection, absorption, and temperature shifts, as compared to the LF signals used to locate traditional PEPS key fobs, at least because of the difference in operating frequencies. For example, the LF signals are typically in the 125 kHz or 134.5 kHz bands, while the BLE signals are typically in the 2.4 GHz band. This fact of physics makes the PaaK device more difficult to locate than a traditional PEPS key fob.

Accordingly, there is still a need in the art for a PEPS system that can implement the PaaK feature with at least the same accuracy and dependability as traditional PEPS key fobs.

SUMMARY

The invention is intended to solve the above-noted and other problems by providing systems and methods for accurately determining the location of a mobile device, such as a smartphone, relative to a vehicle cabin using a plurality of antennas located inside and outside the vehicle cabin.

For example, one embodiment provides a vehicle comprising a plurality of antennas positioned at locations inside and outside a vehicle cabin, each antenna being in wireless communication with an external mobile device and being associated with signal strength information; and a central module in communication with the antennas and configured to identify the antennas with the two strongest signals, and determine a mobile device location relative to the vehicle cabin based on the locations of the identified antennas.

Another example embodiment includes a method comprising receiving signal strength information associated with a plurality of antennas wirelessly communicating with a mobile device, the antennas positioned at locations inside and outside a vehicle cabin; identifying a first antenna having a first highest signal strength and a second antenna having a second highest signal strength; and determining a mobile device location relative to the vehicle cabin based on the locations of the first and second antennas.

As will be appreciated, this disclosure is defined by the appended claims. The description summarizes aspects of the embodiments and should not be used to limit the claims. Other implementations are contemplated in accordance with the techniques described herein, as will be apparent to one having ordinary skill in the art upon examination of the following drawings and detail description, and such implementations are intended to within the scope of this disclosure.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

FIGS. 2-5 are flow diagrams of example methods for determining a mobile device location relative to a vehicle cabin, in accordance with certain embodiments.

DETAILED DESCRIPTION OF EXAMPLE EMBODIMENTS

Figure 1:
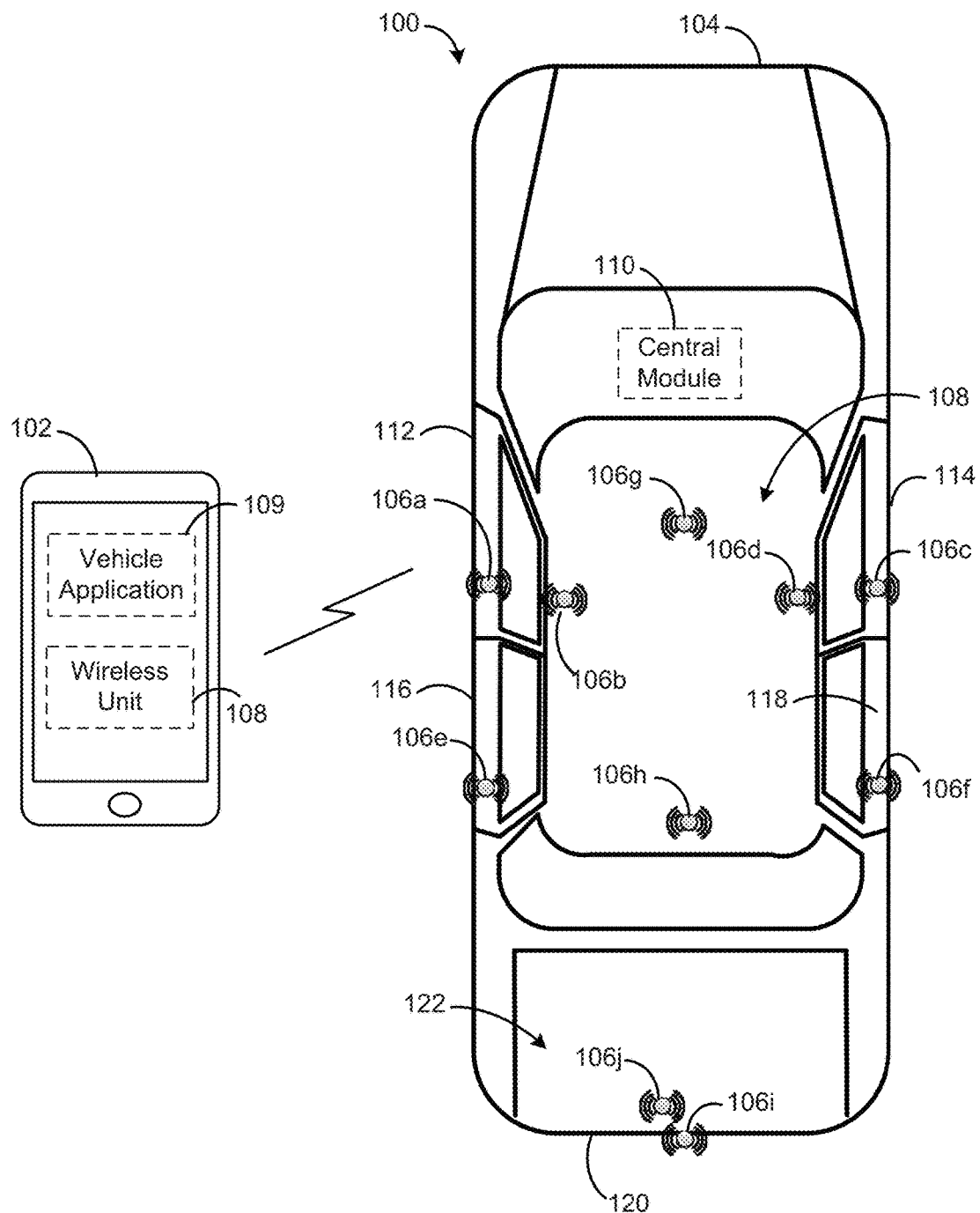
FIG. 1 illustrates an example environment for determining a mobile device location relative to a vehicle cabin using a plurality of vehicle antennas, in accordance with certain embodiments.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects.

FIG. 1 illustrates an example environment 100 for determining a current location of a mobile device 102 relative to a vehicle 104 using a plurality of antennas 106 positioned at various locations inside and outside a cabin area 108 of the vehicle 104, in accordance with embodiments. The vehicle 104 includes a Passive Entry Passive Start (PEPS) system (such as, e.g., PEPS system 604 shown in FIG. 6) for enabling a driver or other vehicle user to passively, remotely, and/or keylessly control various operations or functions of the vehicle 104. The mobile device 102 is configured to implement a Phone-as-a-Key (PaaK) feature of the vehicle's PEPS system, or otherwise function as a key fob authorized to enable passive, remote, and/or keyless initiation of various vehicle operations once certain conditions have been met, including detection of the mobile device 102 within a predetermined proximity of the vehicle 104 and/or within the vehicle cabin 108. The plurality of antennas 106 are included in the vehicle 104 to facilitate the PaaK feature by detecting the presence and/or location of the mobile device 102 using short-range wireless communication technology (such as, e.g., BLUETOOTH Low Energy (BLE)) and conveying such information to the vehicle 104 for processing in connection with operation of the PEPS system. In embodiments, the number and placement of the antennas 106 within the vehicle 104 can be specifically selected to optimize accurate and reliable detection of the mobile device for the purposes of carrying PEPS operations, as described in more detail below.

Though not shown, the environment 100 can also include one or more key fobs that are assigned to, or paired with, the vehicle 104 and configured to implement aspects of the PEPS system. Each key fob can include one or more buttons or switches for enabling direct user control of certain vehicle operations (e.g., through a user input entered into the key fob). Each key fob can also be configured to enable passive, remote, and/or keyless initiation of certain vehicle operations. For example, the PEPS system may automatically unlock one or more vehicle doors upon detecting the presence of the key fob within a predetermined proximity of the vehicle 104 and upon detecting user contact with a door handle of the vehicle 104.

Each key fob may be assigned a unique identifier (ID), or a distinct digital identity code, that is used to communicatively link or pair the key fob to the vehicle 104 and otherwise confirm the validity of the key fob before allowing communication with the vehicle 104. For example, the vehicle 104 can be configured to store the key fob ID of each key fob paired to, or associated with, the vehicle 104, and to only perform commands that are received from key fobs having an ID that matches one of the stored key fob IDs (e.g., a valid key fob ID). In some cases, the key fob may transmit the key fob ID with, or just prior to, each user-entered or passively-initiated key fob command, so that the vehicle 104 can easily validate the source of the command.

In embodiments, the PEPS system enables remote, keyless control of a predefined set of vehicle operations (also referred to herein as "PEPS operations") if one or more conditions associated with a given vehicle operation has been met. As an example, the PEPS operations can include, but are not limited to, locking and unlocking door locks or other electronic locks of the vehicle 104, opening and/or closing a trunk, tailgate, sliding door, or other electronically-operated door of the vehicle 104, opening and/or closing a window or roof of the vehicle 104, and starting an engine of the vehicle 104. As will be appreciated, other vehicle operations may be controllable through the PEPS system, and the present disclosure is intended to cover any and all such operations. The condition(s) that must be met before initiating each PEPS operation can vary depending on the type of vehicle operation, the manufacturer's specifications, user-selected specifications, and/or other relevant factors. For some PEPS operations, such as unlocking one or more door locks and/or opening a sliding door, the PEPS system may be configured to passively initiate the operation (e.g., without receiving a user-entered command) upon detecting that the mobile device 102, or a valid key fob, is outside the vehicle 104, within a predetermined proximity of the vehicle 104, and/or approaching the vehicle 104. For other PEPS operations, such as starting the vehicle engine, the PEPS system may be configured to passively initiate the operation (e.g., without requiring a key) upon detecting the mobile device 102 or key fob within the vehicle cabin 108. As will be appreciated, other conditions involving the mobile device 102 may be tied to each PEPS operation, and the present disclosure is intended to cover any and all such conditions.

The mobile device 102 can be any type of portable electronic device, including, for example, a smartphone or other mobile telephone, a tablet or tablet-type personal computer, a personal digital assistant (PDA), a smartwatch or other wearable device, and the like. According to embodiments, the mobile device 102 can be paired or linked to the vehicle 104 using known wireless pairing techniques for authorizing communications between the mobile device 102 and the vehicle 104. For example, during an initial programming mode, the mobile device 102 may wirelessly transmit, to the vehicle 104 or a cloud computing network associated with the vehicle 104, one of the key fob IDs associated with a key fob linked to the vehicle 104 in order to validate the mobile device 102. The mobile device 102 can communicate with the vehicle 104, or more specifically, a vehicle computing system (VCS) included therein (such as, e.g., VCS 602 shown in FIG. 6), using BLUETOOTH, infrared, radio frequency identification (RFID), near field communication (NFC), WiFi, cellular, satellite, LTE Direct, SDRC, or any other wireless communication technology compatible with the plurality of antennas 106 and/or a telematics control unit (TCU) (such as, e.g., TCU 606 shown in FIG. 6) included in the vehicle 104. The mobile device 102 can include a wireless unit 108 comprising wireless communication circuitry (e.g., one or more antennas, receivers, transmitters, and/or transceivers) for facilitating said communication with the vehicle 104, as will be appreciated.

In some cases, the mobile device 102 can include a software application 109 (or "vehicle application") that is configured to communicate with the vehicle 104 using the wireless unit 108 and via a wireless communications network (not shown), such as, for example, a WiFi network or other wireless Ethernet, cellular network, and/or satellite. In some cases, the wireless communications network is a cloud computing network that is communicatively linked to a remote server or cloud computing device (not shown) that is controlled by, and/or associated with, the vehicle manufacturer. In some embodiments, a secure, wireless communication channel may be pre-established between the vehicle computing system of the vehicle 104 and the cloud computing device in order to enable direct communication between the vehicle 104 and the cloud device without the need for pairing or pre-authorization. The secure communication channel may be established by, or under the supervision of, the vehicle manufacturer.

In embodiments, the vehicle application 109 can be a mobile client that is developed by, and/or associated with, the vehicle manufacturer, and can be customized for the vehicle 104. In some embodiments, the vehicle application 109 may be configured to help implement the PaaK features of the mobile device 102, for example, by providing a user interface on a display screen of the mobile device 102 for controlling certain features of the PEPS system. In some cases, the user interface may present prompts for entering vehicle operation commands, user-selected inputs, or other information for conveyance to the vehicle 104, for example, when the PaaK features are not available or a location of the mobile device 102 cannot be determined, as discussed in more detail below with reference to FIG. 4. The vehicle application 109 may also provide over vehicle information, such as, for example, diagnostic and/or performance information about the vehicle 104, for example, in connection with a vehicle infotainment system (such as, e.g., FORD SYNC®). In embodiments, all or a portion of the vehicle application 109 can be stored in a memory (not shown) of the mobile device 102 and executed by a data processor (not shown) of the mobile device 102.

In some embodiments, during PaaK operation of the mobile device 102, each of the plurality of antennas 106 can be configured to transmit a wireless signal to the mobile device 102 and to receive corresponding signal strength information from the mobile device 102. For example, the antennas 106 may "ping" the mobile device 102 or otherwise send out a challenge or advertise signal in search of the mobile device 102. In some embodiments, the antennas 106 may be configured to continuously transmit this wireless signal, and the mobile device 102 may be configured to continuously look for the transmitted wireless signal, so that the two can be automatically connected once the mobile device 102 is within a wireless communication range of the antennas 106. Upon receipt of the challenge signal, the mobile device 102 may respond with one or more signals comprising device location information, device identification information, signal strength information corresponding to the antennas 106, and/or other information indicating the presence of the mobile device 102.

In other embodiments, the reverse may be true. That is, the mobile device 102 may continuously transmit a wireless signal searching for the antennas 106, and the antennas 106 may be configured to continuously look for the transmitted wireless signal (e.g., challenge or advertising signal). Once the mobile device 102 is within the wireless communication range of the antennas 106, each of the antennas 106 may respond by sending information indicating the presence of the antennas, including device identification information and signal strength information, to the mobile device 102.

In either case, the signal strength information may be provided in the form of a Received Signal Strength Indicator (RSSI) value for each antenna 106, as perceived or measured by the device that receives the challenge signal. That is, if the antennas 106 are transmitting the challenge signal, the signal strength for each antenna 106 is measured by the mobile device 102 upon receipt of the challenge signal from that antenna 106. In such cases, each of the antennas 106 may receive their corresponding RSSI value from the mobile device 102 in a return message, and the antennas 106 may send their signal strength information to the central module 110 for processing. Alternatively, the mobile device 102 may send each antenna's RSSI value directly to the central module 110 for processing. Similarly, if the mobile device 102 is transmitting the challenge signal, each of the antennas 106 receives the challenge signal and measures the signal strength of that signal. In such cases, the antennas 106 send their own RSSI values directly to the central module 110 for processing.

In other embodiments, the mobile device 102 may be configured to perform processing of the signal strength information, instead of the vehicle 104, or more specifically, the VCS included therein, and then send the processed data to the central module 110. For example, if the mobile device 102 is measuring the signal strength of each of the antennas 106, the mobile device 102 may process the signal strength information first and then send the processed data to the central module 110. On the other hand, if the antennas 106 are measuring their signal strength based on the challenge signal transmitted by the mobile device 102, the mobile device 102 may receive signal strength information from each of the antennas 106 for processing.

The antennas 106 can be configured to communicate with the mobile device 102 using a short-range wireless communications network, such as, for example, a standard BLUETOOTH network, a BLUETOOTH Low Energy (BLE) network, an NFC network, an RFID network, etc. The mobile device 102 may be detected by the antennas 106 only after the mobile device 102 moves within a wireless communication range of the antennas 106, or other predetermined distance from the vehicle 104. In a preferred embodiment, the antennas 106 are BLE antennas configured to operate in the 2.4 Gigahertz (GHz) band and use up to three channels to transmit signals to and receive signals from the mobile device 102, for example, through a channel hopping process. In such cases, the wireless unit 108 of the mobile device 102 also includes at least one BLE antenna configured to wirelessly communicate with the antennas 106, for example, once the mobile device 102 is within 100 meters of the vehicle.

As shown in FIG. 1, the vehicle 104 further includes a central module 110. According to embodiments, the central module 110 can be configured to communicate with each of the plurality of antennas 106, via a wired or wireless connection, and to also communicate with the vehicle computing system of the vehicle 104 for carrying out the PEPS operations or other vehicle commands received from the mobile device 102. In particular, each of the antennas 106 can be configured to provide the signal strength information received from the mobile device 102 to the central module 110. In embodiments, the central module 110 can be configured to process the received information and identify a location of the mobile device 102 based on the received information, for example, using one or more of the methods shown in FIGS. 2-5, as discussed in more detail below. Based on the identified location, the central module 110 can be further configured to enable either a passive start operation of the PEPS system, if the mobile device 102 is located inside the vehicle cabin 108, or a passive entry operation of the PEPS system, if the mobile device 102 is located outside the vehicle cabin 108. For example, the central module 110 may enable the passive start operation by instructing the vehicle computing system, or a powertrain control module therein, to start the vehicle engine and may enable the passive entry operation by instructing the vehicle computing system, or a body control module therein, to unlock the vehicle doors.

As shown in FIG. 1, the antennas 106 can be positioned at various locations on the vehicle 104, inside and outside the vehicle cabin 108. In embodiments, the exact locations of the antennas 106, as well as the number of antennas 106 placed at each location and/or throughout the vehicle 104, can be specifically selected to ensure accurate, repeatable, and reliable detection of the mobile device 102 during PEPS operation. For example, the placement and number of the antennas 106 may be configured to more accurately pinpoint whether the mobile device 102 is located inside or outside the vehicle cabin 108, adjacent to a driver-side, passenger-side, front end, or back end of the vehicle 104, and/or in a front, middle, or rear passenger row of the vehicle 104.

FIG. 1 shows an exemplary embodiment in which a first antenna 106a is positioned outside the vehicle cabin 108 adjacent to a front driver-side door 112 of the vehicle 104, while a second antenna 106b is positioned inside the vehicle cabin 108 adjacent to the front driver-side door 112. In addition, a third antenna 106c is positioned outside the vehicle cabin 108 adjacent to a front passenger-side door 114 of the vehicle 104, while a fourth antenna 106d is positioned inside the vehicle cabin 108 adjacent to the front passenger-side door 114. As shown in FIG. 1, the plurality of antennas 106 can also include a fifth antenna 106e positioned adjacent to a rear, driver-side door 116 and a sixth antenna 106f positioned adjacent to a rear, passenger-side door 118. The fifth and sixth antennas 106e and 106f may be positioned inside or outside the rear doors 116 and 118, respectively. In some cases, one or more additional antennas (not shown) may be added to the doors 116 and 118, so that an antenna is positioned on both the interior and exterior surfaces of the doors.

The exact location of the antennas 106a-106f (also referred to herein as "door antennas") on the doors 112, 114, 116, and 118 can vary depending on a number of factors, including, for example, the make and model of the vehicle 104, the vehicle manufacturer's preferences, optimizing antenna performance, and/or the amount of space available for antenna placement. As an example, the inside door antennas may be located on or within an interior door panel or other interior surface of the vehicle doors, an interior trim panel of a pillar (e.g., A-pillar, B-pillar, or C-pillar) adjacent to the inside of the vehicle doors, or any other surface adjacent to the inside of the vehicle doors. Likewise, the outside door antennas may be located on or within an exterior door panel or other exterior surface of the vehicle doors, an exterior panel of a pillar adjacent to the outside of the vehicle doors, or a rocker panel, side mirror, vent, or any other surface adjacent to the outside of the vehicle doors.

As illustrated, the antennas 106 may further include a seventh antenna 106g positioned inside the vehicle cabin 108 between the two front doors 112 and 114, for example, adjacent to a center console (not shown) located between two front seats, a front dashboard (not shown) located in front of a front passenger row, a front headliner (not shown) located above a front passenger area, or any other surface in the front passenger area of the cabin 108. In addition, the antennas 106 may include an eighth antenna 106h positioned inside the vehicle cabin 108 between the two rear doors 116 and 118, for example, on or within a rear headliner (not shown) located above a rear passenger area, a rear dashboard or shelf located behind the rear passenger seats, or any other surface in the rear passenger area of the cabin 108.

The illustrated embodiment also includes a ninth antenna 106i positioned outside the vehicle cabin 108 adjacent to a rear liftgate 120 of the vehicle 104. As an example, the ninth antenna 106i may be positioned on or within an exterior door panel or other exterior surface of the liftgate 120, a rear fender of the vehicle 104, or any other surface adjacent to the outside of the liftgate 120. As illustrated, the plurality of antennas 106 can also include a tenth antenna 106j positioned inside the vehicle cabin 108 adjacent to the liftgate 120 and a trunk space 122 of the vehicle 104. As an example, the tenth antenna 106j may be positioned on or within a trunk headliner or other interior surface of the trunk 122, an interior door panel or other interior surface of the liftgate 120, or any other surface adjacent to the inside of the liftgate 120 and/or the trunk 122.

Other embodiments may include additional antennas 106 positioned at other suitable locations inside or outside the vehicle 104, including, for example, adjacent to a front end of the vehicle 104 (e.g., on or within a front vehicle fender, adjacent to an appliqué or badge zone on the front end of the vehicle 104, on or within a vent on the front end of the vehicle 104, etc.) and/or adjacent to a third passenger row, if present in the vehicle, inside or outside the vehicle cabin 108 (e.g., on or within a headliner for the third row, an interior or exterior surface of a pillar adjacent to the third row, or an exterior rocker panel adjacent to the third row). As will be appreciated, the locations and number of antennas 106 shown and described herein, including FIG. 1, are meant to be an exemplification of the techniques described herein, and the present disclosure is not limited to the antenna arrangement shown and described herein. Moreover, the scope of the present disclosure is intended to include any number of antennas 106 at any combination of locations inside and outside the vehicle 104.

Figure 2:
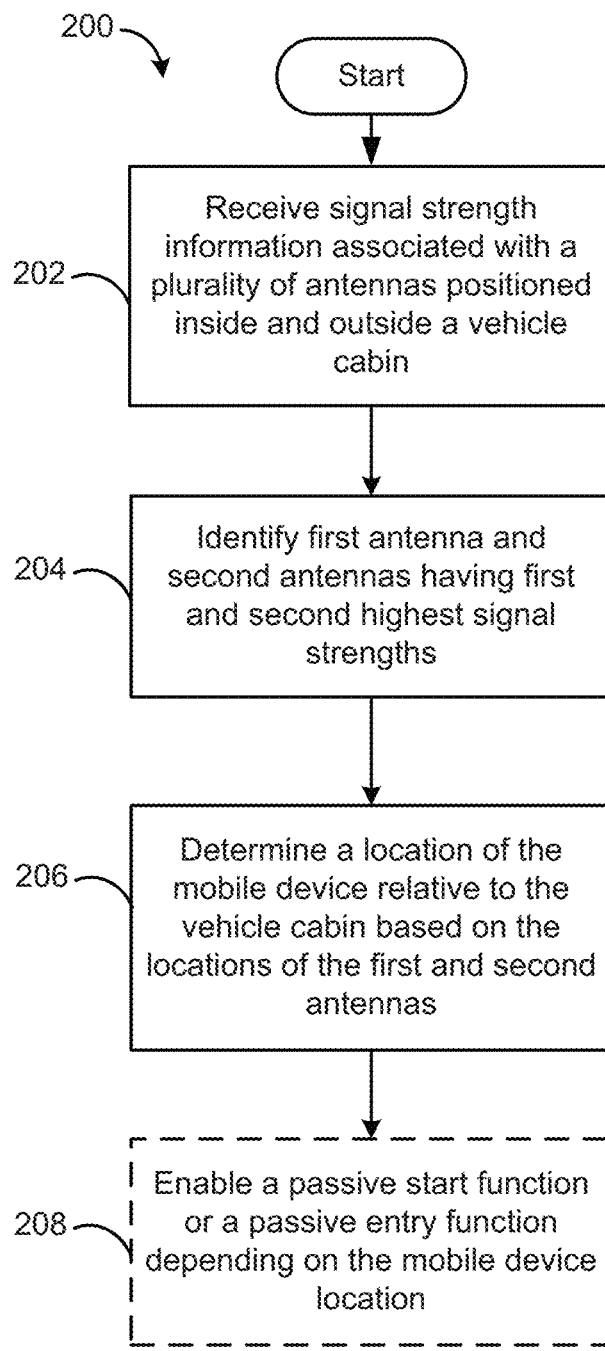

FIG. 2 illustrates an example method 200 for determining the location of a mobile device relative to a vehicle cabin, in accordance with embodiments. The method 200 can be carried out by a vehicle system (such as, e.g., vehicle system 600 shown in FIG. 6) included in a vehicle (such as, e.g., the vehicle 104 shown in FIG. 1), or more specifically, a computing device included therein, such as, for example, central module 608 shown in FIG. 6 or central module 110 shown in FIG. 1. For example, the method 200 may be implemented, at least in part, by a processor (not shown) of the computing device executing a software application stored in a memory (not shown) of the computing device. Further, to carry out the operations of the method 200, the computing device can interact with a plurality of antennas (such as, e.g., the antennas 106 shown in FIG. 1) positioned at various locations inside and outside a vehicle cabin (such as, e.g., the vehicle cabin 108 shown in FIG. 1). The antennas interact with a mobile device (such as, e.g., the mobile device 102 shown in FIG. 1) that is paired with the vehicle or is otherwise operating as a PaaK device associated with a PEPS system of the vehicle.

As shown in FIG. 2, the method 200 begins at step 202 with the processor receiving signal strength information for each of the antennas. The signal strength information for a given antenna may be a Received Signal Strength Indicator (RSSI) value as perceived or measured by the device that receives a wireless signal for requesting signal strength information. In some embodiments, the processor receives the signal strength information for each of the antennas from the mobile device via the central module. For example, the mobile device may measure the signal strength of each antenna in response to a challenge signal received from the antenna and send the signal strength information for each antenna directly to the central module. Alternatively, each of the antennas may measure its own signal strength in response to a challenge signal received from the mobile device and send the measured signal strength to the mobile device, and the mobile device may send signal strength information for the antennas to the central module. In other embodiments, the processor receives the signal strength information for a given antenna from the corresponding antenna via the central module. For example, the mobile device may measure the signal strength of each antenna and send the measured signal strength to the corresponding antenna, and each of the antennas may send their signal strength information to the central module. Alternatively, each of the antennas may measure its own signal strength in response to a challenge signal received from the mobile device and send the measured signal strength information directly to the central module.

At step 204, the processor compares the signal strength information for the plurality of antennas and identifies the antenna having the first highest signal strength (also referred to as the "first antenna") and the antenna having the second highest signal strength (also referred to as the "second antenna"). In some embodiments, if the two strongest signals have the same RSSI value, both of the corresponding antennas may be identified as the first and second antennas.

In some embodiments, the method 200 also includes determining the location of the first antenna and the second antenna within the vehicle. In some embodiments, the processor may determine the vehicle location for each antenna based on location information transmitted by the antenna to the central module, where the location information identifies the location of the antenna within the vehicle (e.g., adjacent to the front driver-side door inside the vehicle cabin or adjacent to the rear passenger-side door outside the vehicle cabin, etc.). In other embodiments, each antenna may send antenna identification information (e.g., an antenna identifier) to the central module, and the processor may determine the vehicle location of the antenna using a look-up table or other database stored in the memory, where the look-up table lists the vehicle location associated with each antenna identifier.

At step 206, the processor determines a location of the mobile device relative to the vehicle cabin based on the vehicle locations of the first and second antennas. In some embodiments, the method 200 further includes step 208, where the processor enables a passive start function or a passive entry function depending on whether the mobile device location is inside or outside the vehicle cabin.

FIG. 3 illustrates an example method 300 for carrying out the operations that may be included in step 206, in accordance with embodiments. As shown, the method 300 begins at step 302 with the processor determining whether both the first antenna and the second antenna are located inside the vehicle cabin. If a positive determination is made (e.g., "Yes"), the method 300 continues to step 304, where the processor identifies the mobile device as being located inside the vehicle cabin. For example, referring back to FIG. 1, if the antenna with the first highest signal strength is the antenna 106b located inside the front, driver-side door 112 and the antenna with the second highest signal strength is the antenna 106g located within the front passenger area of the vehicle cabin 108, the processor will determine that the mobile device 102 is located inside the vehicle cabin 108. In some embodiments, once the processor identifies the mobile device as being inside the vehicle cabin, the method 300 continues to step 306, where the processor enables a passive start function of the PEPS system, similar to step 208 shown in FIG. 2. In other embodiments, the processor may enable one or more other PEPS operations in response to identifying the mobile device location as being inside the vehicle.

If a negative determination is made at step 302 (e.g., "No"), the method 300 continues to step 308, where the processor determines whether both the first antenna and the second antenna are located outside the vehicle cabin. If a positive determination is made (e.g., "Yes"), the method 300 continues to step 310, where the processor identifies the mobile device as being located outside the vehicle cabin. For example, referring back to FIG. 1, if the antenna with the first highest signal strength is the antenna 106a located outside the front, driver-side door 112 and the antenna with the second highest signal strength is the antenna 106e located outside the rear, driver-side door 116, the processor will determine that the mobile device 102 is located outside the vehicle cabin 108. In some embodiments, once the processor identifies the mobile device as being outside the vehicle cabin, the method 300 continues to step 312, where the processor enables a passive entry function of the PEPS system, similar to step 208 shown in FIG. 2. In other embodiments, the processor may enable one or more other PEPS operations in response to identifying the mobile device location as being outside the vehicle.

If a negative determination is made at step 308 (e.g., "No"), the method 300 continues to step 314. As an example, a negative determination may be made at step 308 if the processor determines that one of the first and second antennas is located outside the vehicle cabin and the other of the first and second antennas is located inside the vehicle cabin. At step 314, the processor calculates a difference between the first high signal strength associated with the first antenna and the signal strength of an antenna positioned opposite the first antenna relative to the vehicle cabin (also referred to herein as an "opposing antenna"). For example, if the first antenna is located outside one of the vehicle doors, the corresponding opposing antenna would be the antenna located inside that vehicle door. As another example, if the first antenna is located inside the vehicle trunk or rear liftgate (e.g., the antenna 106j shown in FIG. 1), the corresponding opposing antenna would be the antenna located outside the trunk or liftgate (e.g., the antenna 106i shown in FIG. 1). In some cases, the opposing antenna may be the second antenna having the second highest signal strength, for example, where the first antenna is the antenna 106a located outside the front, driver-side door 112 and the second antenna is the antenna 106b located inside the front, driver-side door 114, as shown in FIG. 1.

At step 316, the processor determines whether the difference calculated at step 314 is greater than a threshold value. If the difference equals or exceeds the threshold value (e.g., "Yes"), the method 300 continues to step 318, where the processor identifies the mobile device as being located in the same position relative to the vehicle cabin as the first antenna. For example, if the first antenna is located inside the vehicle cabin, then, at step 318, the processor determines that the mobile device also located inside the vehicle cabin. Likewise, if the first antenna is located outside the vehicle cabin, then, at step 318, the processor determines that the mobile device is also located outside the vehicle cabin. If the difference calculated at step 314 does not exceed the threshold value (e.g., "No"), the method 300 continues to step 320, where the processor 300 initiates an alternative authorization sequence associated with the PEPS system. In embodiments, the threshold value may be selected so as to correspond to a significant margin between the signal strengths of the inside and outside antennas. When the difference calculated at step 314 equals or exceeds this margin, the outside location of the mobile device can be determined with sufficient certainty. However, when the difference in signal strength between these two antennas does not exceed the threshold value, the current location of the mobile device cannot be determined with sufficient certainty.

In some embodiments, from step 318, the method 300 continues to step 322, where the processor enables a passive start function or a passive entry function depending on the mobile device location identified at step 318, similar to step 208 shown in FIG. 2. For example, if the mobile device location is outside the vehicle cabin, the processor may enable a passive entry function. Likewise, if the mobile device location is inside the vehicle cabin, the processor may enable a passive start function.

FIGS. 4 and 5 illustrate two alternative methods 400 and 500 for carrying out the alternative authorization sequence initiated at step 320 of FIG. 3, in accordance with embodiments. Referring first to FIG. 4, the alternative authorization sequence provided by the method 400 begins at step 402 with the processor causing an active authorization prompt to be displayed on a display screen of the mobile device. For example, the mobile device may display the active authorization prompt in response to receive a wireless signal, from the processor and/or vehicle, comprising a command to display the prompt. In embodiments, active authorization prompt may be presented using a graphical user interface generated by the mobile device, or more specifically, a software application executed by the mobile device (such as, e.g., the vehicle application 109 shown in FIG. 1). The active authorization prompt may be configured to inform the mobile device user that the vehicle cannot determine the exact location of the mobile device and to request a user input indicating which PEPS operation the user would like to execute (e.g., start the engine, unlock one or more vehicle doors, open a liftgate or trunk, etc.). At step 404, the processor receives the user-selected input, or vehicle command, from the mobile device. For example, the mobile device may send a wireless signal comprising the user-selected command to the processor and/or the vehicle. At step 406, the processor executes the received command and/or provides the received command to an appropriate unit of the vehicle computing system to carry out the command. For example, a command to start the engine may be provided to the powertrain control module of the vehicle computing system, while a command to unlock the doors may be provided to the body control module of the vehicle computing system. In other embodiments, the method 400 may be carried out using a display screen included in the vehicle (such as, e.g., human-machine interface (HMI) 622 shown in FIG. 6) and a graphical user interface displayed on the vehicle screen.

Referring now to FIG. 5, the alternative authorization sequence provided by the method 500 begins at step 502 with the processor causing a reduction in a transmit power level associated with the first antenna and the power level associated with the corresponding opposing antenna identified at step 314 of FIG. 3. For example, in some embodiments, the processor may send a command signal to each of the first antenna and the opposing antenna directing the antennas to reduce their respective transmit power levels. In response, the signal strength measured by the mobile device for each of the first antenna and the opposing antenna may be affected. In other embodiments, the processor may send a command signal to the mobile device directing the mobile device to reduce its transmit power level. In response to this instruction, the signal strength measured by each of the first antenna and the opposing antenna may be affected. In either case, the method 500 may further include the processor receiving new signal strength information (e.g., RSSI values) associated with each of the first antenna and the opposing antenna, and for each of the two antennas, comparing the new signal strength information to the old signal strength information previously received at step 202 of the method 200.

At step 504, the processor uses the results of this comparison to identify one of the two antennas as having a greater drop in signal strength due to the reduction in transmit power as compared to the other antenna. For example, if one of the two antennas has a high signal strength that is primarily caused by reflections and other external factors, the drop in transmit power will result in a higher level of signal degradation, thus causing a relatively greater drop in signal strength when compared to the other antenna. On the other hand, if one of the two antennas has a high signal strength because the mobile device is relatively close to that antenna, the drop in transmit power will cause a proportionate drop in signal strength for that antenna.

At step 506, the processor determines whether the antenna identified at step 504 is outside the vehicle cabin. If a positive determination is made (e.g., "Yes"), the method 500 continues to step 508, where the processor identifies the mobile device as being located outside the vehicle cabin. In some embodiments, from step 508, the method 500 continues to step 510, where the processor enables a passive entry function of the PEPS system, similar to step 312 in FIG. 3. If, on the other hand, a negative determination is made at step 506 (e.g., "No"), the identified antenna is determined to be positioned inside the vehicle, and the method 500 continues to step 512, where the processor identifies the mobile device as being located inside the vehicle cabin. In some embodiments, from step 512, the method 500 continues to step 514, where the processor enables a passive start function of the PEPS system, similar to step 306 of FIG. 3. In other embodiments, the step 510 may enable other PEPS operations requiring an outside mobile device location, and the step 514 may enable other PEPS operations requiring an inside mobile device location.

In some embodiments, the method 200 may end upon reaching any of the steps 306, 312, or 322 shown in FIG. 3, if the mobile device location can be identified with sufficient certainty. Otherwise, the method 200 may end upon completion of the step 406 shown in FIG. 4 or one of the steps 510 and 514 shown in FIG. 5, depending on which alternative authorization sequence is initiated at step 320 of FIG. 3.

Figure 6:
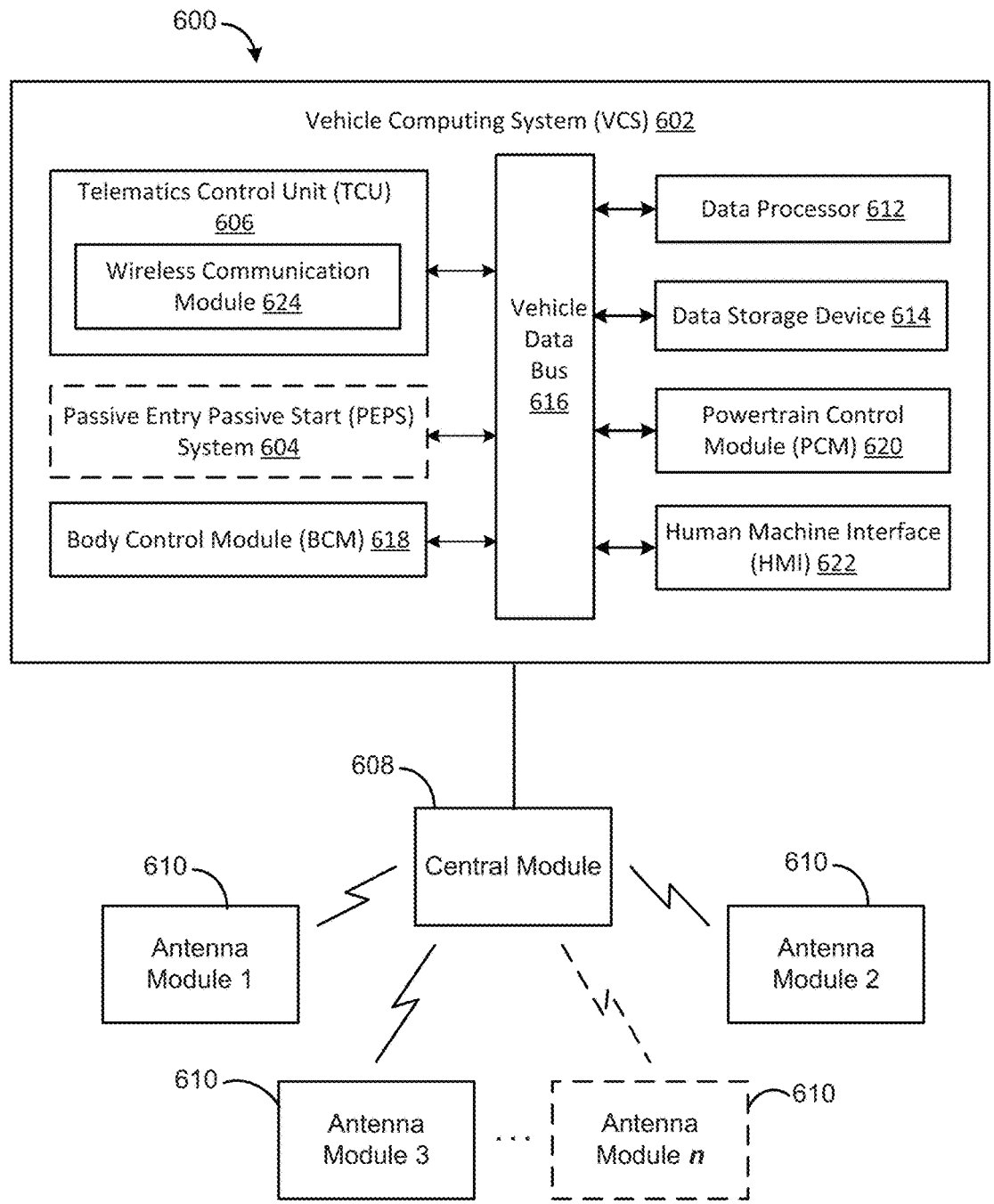
FIG. 6 is a block diagram of an example vehicle system, in accordance with certain embodiments.

FIG. 6 depicts an exemplary vehicle system 600 comprising a vehicle computing system (VCS) 602 that may be included in the vehicle 104, for example, as part of a vehicle electronics system or an infotainment system of the vehicle 104, in accordance with embodiments. The VCS 602 may be an infotainment system such as the SYNC® system manufactured by FORD MOTOR COMPANY®. Other embodiments of the VCS 602 can include different, fewer, or additional components than those described below and shown in FIG. 6. In embodiments, the components of the vehicle system 600 can be configured to communicate with the mobile device 102 and receive, process, and execute the command inputs received therefrom, either actively or passively.

As shown in FIG. 6, the vehicle system 600 also includes a central module 608 in wired or wireless communication with the VCS 602, and a plurality of antenna modules 610 in wired or wireless communication with the central module 608. In some embodiments, the central module 608 is configured to communicate with the antenna modules 610 using a short-range wireless communications network, such as, for example, a BLUETOOTH Low Energy (BLE) network. The central module 608 may be similar to the central module 110 included in the vehicle 104 shown in FIG. 1. In embodiments, the central module 608 includes a computing device (not shown) comprising at least a memory for storing one or more computer programs comprising software instructions and a processor for executing said software instructions. For example, the stored computer programs may include software instructions for implementing one or more of the methods 200, 300, 400, and 500. The central module 608 also includes wireless communication circuitry (not shown) (e.g., one or more antennas, transmitters, receivers, and/or transceivers) for facilitating wireless communication with the antenna modules 610 and, in some cases, with the VCS 602. In a preferred embodiment, the central module 608 includes a BLUETOOTH, BLE, or other short-range receiver (not shown) for receiving vehicle commands and/or data transmitted by the key fob, the mobile/PaaK device, and/or the antenna modules 610, and/or a BLUETOOTH, BLE, or other short-range transmitter (not shown) for sending data to the key fob, the PaaK device, and/or the antenna modules 610.

Each of the antenna modules 610 includes an antenna, such as, for example, one of the antennas 106 shown in FIG. 1, as well as other wireless communication circuitry (not shown) for facilitating wireless communication with a mobile device, such as the mobile device 102 shown in FIG. 1, and, in some cases, with the central module 608. In a preferred embodiment, the antenna modules 610 are configured to communicate with the mobile device using a short-range wireless communications network, such as, for example, BLUETOOTH Low Energy (BLE) network. Each antenna module 610 may also include a computing device (not shown) comprising at least a memory for storing one or more computer programs comprising software instructions and a processor for executing said software instructions. For example, the stored computer programs may include software instructions related to initiating communication with the mobile device and/or providing information received from the mobile device to the central module 608. In some cases, the memory also stores antenna identification information (e.g., an antenna identifier (ID)) for uniquely identifying the antenna module 610 and/or the antenna included therein. In some cases, the memory also stores location information for identifying the location of the antenna module 610 in the vehicle. The exact number of antenna modules 610 included in the vehicle system 600 can depend on the number of antennas 106 included in the vehicle 104. In certain embodiments, the vehicle system 600 includes at least three antenna modules 610 in order to accurately and reliably detect the location of a mobile device.

As shown in FIG. 6, the VCS 602 can include a data processor 612 (e.g., an electronic data processor), a data storage device 614, and a vehicle data bus 616. The VCS 602 can further includes various electronic control units (ECUs) that are responsible for monitoring and controlling the electrical systems or subsystems of the vehicle 104. Each ECU may include, for example, one or more inputs and outputs for gathering, receiving, and/or transmitting data, a memory for storing the data, and a processor for processing the data and/or generating new information based thereon. In the illustrated embodiment, the ECUs of the VCS 602 include the Passive Entry Passive Start (PEPS) system 604, the telematics control unit (TCU) 606, a body control module (BCM) 618, a powertrain control module (PCM) 620, and a human-machine interface (HMI) 622.

The ECUs of the VCS 602 can be interconnected by the vehicle bus 616 (such as, e.g., a controller area network (CAN) bus), which passes data to and from the various ECUs, as well as other vehicle and/or auxiliary components in communication with the VCS 602. Further, the data processor 612 can communicate with any one of the ECUs and the data storage device 614 via the data bus 616 in order to carry out one or more functions and/or to support interactions with the mobile device 102 and/or the central module 608, including those associated with one or more of the methods 200, 300, 400, and 500 shown in FIGS. 2-5.

The PEPS system 604 is an ECU configured for controlling and monitoring passive, remote, and/or keyless interactions between a key fob (not shown) and the vehicle 104, or the mobile device 102 and the vehicle 104, where the mobile device is operating as a Phone-as-a-Key (PaaK) device. In embodiments, the PEPS system 604 can include a remote keyless entry system and a remote keyless ignition system. In some embodiments, the PEPS system 604 is a separate, stand-alone ECU that is interconnected to the BCM 618, PCM 620, TCU 606, and other ECUs of the vehicle 104 via the vehicle bus 616 in order to carry out PEPS operations and other vehicle commands. For example, the PEPS system 604 may receive vehicle commands from the key fob, the mobile device, and/or the central module 608 via the TCU 606, process the commands to identify the appropriate ECU for carrying out the command, send the command to the identified ECU, and confirm performance of the command. In other embodiments, the PEPS system 604 may be comprised of multiple segments that are incorporated into various ECUs of the VCS 602, such as, for example, the BCM 618, the PCM 620, and/or the TCU 606, to process the PEPS commands received at each ECU. In still other embodiments, the PEPS system 604 may be included within one ECU, such as, e.g., the TCU 606, in order to handle or process PEPS commands as they are received by the TCU 606.

In some cases, vehicle commands are received at the PEPS system 604 directly from the PaaK/mobile device, for example, when operation of the vehicle command does not depend on the location of the mobile device relative to the vehicle cabin. In other cases, vehicle commands may be received at the PEPS system 604 via the central module 608, for example, when the vehicle command is a PEPS operation that can be executed only after the central module 608 determines the location of the PaaK/mobile device. As an example, a passive entry command may not be executed until the central module 608 determines that the mobile device is outside the vehicle, and a passive start command may not be executed until the central module 608 determines that the mobile device is inside the vehicle. In still other cases, the mobile device may communicate vehicle commands directly to the central module 608 and the central module 608 may convey the commands to the PEPS system 604 for execution, regardless of whether a particular location of the mobile device is required to execute the command (such as, for example, remote start, remote/active entry, or other RKE functions).

The body control module (BCM) 618 is an ECU for controlling and monitoring various electronic accessories in a body of the vehicle 104. In embodiments, the BCM 618 is an ECU that controls the doors, trunk, and/or liftgate of the vehicle 104, including locking, unlocking, opening, and/or closing said units. In some embodiments, the BCM 618 also controls the power windows, power roof (e.g., moonroof, sunroof, convertible top, etc.), and interior lighting of the vehicle 104. The BCM 618 may also control other electronically-powered components in the body of the vehicle 104, such as, for example, air-conditioning units, power mirrors, and power seats. In cases where the BCM 618 only controls and monitors the doors of the vehicle 104, the BCM 618 may be referred to as the door control unit (DCU), as will be appreciated. The BCM 618 can be configured to implement commands received from the key fob, the PaaK device, and/or the central module 608 that are related to the doors, windows, or other body components controlled by the BCM 618.

The powertrain control module (PCM) 620 is an ECU for controlling and monitoring the engine and transmission of the vehicle 104. In some embodiments, the PCM 620 can be separated into two separate ECUs, specifically an engine control unit and a transmission control unit. In either case, the PCM 620 can be configured to control starting and stopping of the engine of the vehicle 104, and may implement commands to start the engine received from the key fob, the mobile device, and/or the central module 608.

The telematics control unit (TCU) 606 is an ECU for enabling the vehicle 104 to connect to various wireless networks, including, for example, GPS, WiFi, cellular, BLUETOOTH, BLUETOOTH Low Energy (BLE), NFC, RFID, satellite, and/or infrared. In embodiments, the TCU 606 (also referred to as a "vehicle telematics unit") includes a wireless communication module 624 comprising one or more antennas, radios, modems, receivers, and/or transmitters (not shown) for connecting to the various wireless networks. For example, the wireless communication module 624 can include a mobile communication unit (not shown) for wirelessly communicating over a cellular network (e.g., GSM, GPRS, LTE, 3G, 4G, CDMA, etc.), an 612.11 network (e.g., WiFi), a WiMax network, and/or a satellite network. The TCU 606 can also be configured to control tracking of the vehicle 104 using latitude and longitude values obtained from a GPS satellite. In a preferred embodiment, the wireless communication module 624 includes a BLUETOOTH, BLE, or other short-range receiver (not shown) for receiving vehicle commands and/or data transmitted by the key fob or PaaK device, and/or a BLUETOOTH, BLE, or other short-range transmitter (not shown) for sending data to the key fob or PaaK device.

In embodiments, the TCU 606 receives external data, including command inputs from the key fob and/or the PaaK device, via the wireless communication module 624 and provides the external data to an appropriate ECU of the VCS 602. For example, if the TCU 606 receives a lock door command, the TCU 606 sends the command to the BCM 618 via the vehicle bus 616. Likewise, if the TCU 606 receives a start engine command, the TCU 606 sends the command to the PCM 620 via the vehicle bus 616. In some embodiments, the TCU 606 also receives internal data from other ECUs of the VCS 602 and/or the data processor 612, with instructions to transmit the internal data to the mobile device, the central module 608, or another component of the vehicle system 600.

The human-machine interface (HMI) 622 (also referred to as a "user interface") can be an ECU for enabling user interaction with the vehicle 104 and for presenting vehicle information to the vehicle operator or driver. Though not shown, the HMI 622 can comprise an instrument panel (IP), a media display screen, as well as one or more input devices and/or output devices for inputting, entering, receiving, capturing, displaying, or outputting data associated with the vehicle computing system 602, the method 400 shown in FIG. 4, or the techniques disclosed herein. The HMI 622 can be configured to interact with the other ECUs of the VCS 602 and/or the data processor 612 via the data bus 616 in order to provide information or inputs received via the HMI 622 to an appropriate component of the VCS 602 and to present, to the vehicle operator or driver, information or outputs received from the various components of the VCS 602.

The data processor 612 can comprise one or more of a microprocessor, a microcontroller, a programmable logic array, an application-specific integrated circuit, a logic device, or other electronic device for processing, inputting, outputting, manipulating, storing, or retrieving data. In embodiments, the VCS 602 can comprise a general purpose computer that is programmed with various programming instructions or modules stored in the data storage device 614 (e.g., electronic memory), or elsewhere.

The data storage device 614 can comprise one or more of electronic memory, nonvolatile random access memory (e.g., RAM), flip-flops, a computer-writable or computer-readable storage medium, a magnetic or optical data storage device, a magnetic or optical disc drive, a hard disk drive, or other electronic device for storing, retrieving, reading, or writing data. The data storage device 614 stores one or more software program modules or software instructions for execution by the data processor 612.

In certain embodiments, the process descriptions or blocks in the figures, such as FIGS. 2-5, can represent modules, segments, or portions of code which include one or more executable instructions for implementing specific logical functions or steps in the process. Any alternate implementations are included within the scope of the embodiments described herein, in which functions may be executed out of order from that shown or discussed, including substantially concurrently or in reverse order, depending on the functionality involved, as would be understood by those having ordinary skill in the art.

It should be emphasized that the above-described embodiments, particularly, any "preferred" embodiments, are possible examples of implementations, merely set forth for a clear understanding of the principles of the invention. Many variations and modifications may be made to the above-described embodiment(s) without substantially departing from the spirit and principles of the techniques described herein. All such modifications are intended to be included herein within the scope of this disclosure and protected by the following claims.

The invention claimed is:

1. A vehicle, comprising:
a plurality of antennas positioned at locations inside and outside a vehicle cabin, each antenna being in wireless communication with an external mobile device and being associated with signal strength information; and
a central module in communication with the antennas and configured to:
identify the antennas with the two strongest signals, and
determining that one of identified antennas is positioned outside the vehicle cabin and one inside opposite the other relative to vehicle cabin, and if a difference between the signal strength of the identified antennas exceeds a threshold value, identifying the mobile device as being located in the same position relative to the vehicle cabin as the first antenna.

2. The vehicle of claim 1, wherein the mobile device is configured to operate as a vehicle key fob capable of remotely controlling a predetermined set of vehicle operations.

3. The vehicle of claim 1, wherein the central module is further configured to:
  enable a passive start function if the mobile device is located inside the vehicle cabin; and
  enable a passive entry function if the mobile device is located outside the vehicle cabin.

4. The vehicle of claim 1, wherein the plurality of antennas communicate with the mobile device using short-range wireless communications network.

5. The vehicle of claim 4, wherein the short-range wireless communications network is a BLUETOOTH network.

6. The vehicle of claim 1, wherein the associated signal strength information includes a Received Signal Strength Indication (RSSI) value for the antenna.

7. The vehicle of claim 1, wherein the plurality of antennas include a first antenna located on the outside of a front driver-side door of the vehicle and a second antenna located on the inside of the front driver-side door.

8. The vehicle of the claim 7, wherein the plurality of antennas further includes a third antenna located on the outside of a front passenger-side door of the vehicle and a fourth antenna located on the inside of the front passenger-side door of the vehicle.

9. The vehicle of claim 7, wherein the plurality of antennas further includes at least one antenna located adjacent to a center console inside the vehicle cabin.

10. The vehicle of claim 7, wherein the plurality of antennas further includes at least one antenna located adjacent to a rear headliner inside the vehicle cabin.

11. The vehicle of claim 7, wherein the plurality of antennas further includes at least one antenna located adjacent to a rear lift gate of the vehicle.

12. A method, comprising:
  receiving signal strength information associated with a plurality of antennas wirelessly communicating with a mobile device, the antennas positioned at locations inside and outside a vehicle cabin;
  identifying a first antennas having a first highest signal strength and a second antennae having a second highest signal strength;
  determining whether one of the first and second antennas is positioned outside the vehicle cabin and the other is positioned inside;
  if so, calculating a difference between the first and second highest signal strength of the second antenna positioned opposite the first antenna relative to the vehicle cabin; and
  if the difference exceeds a threshold value, identifying the mobile device as being located in the same position relative to the vehicle cabin as the first antenna.

13. The method of claim 12, wherein determining a mobile device location relative to the vehicle cabin includes:
  determining whether both the first and second antennas are positioned inside the vehicle cabin; and
  if so, identifying the mobile device as being located inside the vehicle cabin.

14. The method of claim 12, wherein determining a mobile device location relative to the vehicle cabin includes:
  determining whether both the first and second antennas are positioned outside the vehicle cabin; and
  if so, identifying the mobile device as being located outside the vehicle cabin.

15. The method of claim 12, wherein if the first antenna is positioned outside a vehicle door, the opposing antenna is positioned inside the vehicle door.

16. The method of claim 15, wherein determining a mobile device location relative to the vehicle cabin further includes: if the difference does not exceed the threshold value, initiating an alternative authorization sequence.

17. The method of claim 16, wherein the alternative authorization sequence includes:
  causing an active authorization prompt to be displayed on the mobile device;
  receiving a user-selected command from the mobile device in response to the prompt; and
  executing the received command.

18. The method of claim 16, wherein the alternative authorization sequence includes:
  causing a reduction in a transmit power level associated with the first antenna and a transmit power level associated with the opposing antenna;
  identifying one of the first antenna and the opposing antenna as having a greater resulting drop in signal strength;
  if the identified antenna is positioned outside the vehicle cabin, identifying the mobile device as being located inside the vehicle cabin.

19. The method of claim 12, further comprising:
  enabling a passive start function if the mobile device is located inside the vehicle cabin; and
  enabling a passive entry function if the mobile device is located outside the vehicle cabin.

* * * * *

UNITED STATES PATENT AND TRADEMARK OFFICE
CERTIFICATE OF CORRECTION

PATENT NO. : 9,894,492 B1
APPLICATION NO. : 15/273548
DATED : February 13, 2018
INVENTOR(S) : Vivekanandh Elangovan et al.

Page 1 of 1

It is certified that error appears in the above-identified patent and that said Letters Patent is hereby corrected as shown below:

In Claim 12, Column 17, Lines 44-46:
Please replace the text as shown:
identifying a first antenna having a first highest signal strength and a second antenna having a second highest signal strength;

Signed and Sealed this
Fifteenth Day of May, 2018

Andrei Iancu
*Director of the United States Patent and Trademark Office*